US011052621B2

(12) United States Patent
Chou

(10) Patent No.: US 11,052,621 B2
(45) Date of Patent: Jul. 6, 2021

(54) COMBINATION STRUCTURE FOR A HOSE CONNECTED BETWEEN AN AIR COMPRESSOR AND A TIRE

(71) Applicant: UNIK WORLD INDUSTRIAL CO., LTD., Tainan (TW)

(72) Inventor: Wen-San Chou, Tainan (TW)

(73) Assignee: UNIK WORLD INDUSTRIAL CO., LTD., Tainan (TW)

(*) Notice: Subject to any disclaimer, the term of this patent is extended or adjusted under 35 U.S.C. 154(b) by 49 days.

(21) Appl. No.: 16/221,216

(22) Filed: Dec. 14, 2018

(65) Prior Publication Data
US 2019/0193349 A1 Jun. 27, 2019

(51) Int. Cl.
| B29C 73/16 | (2006.01) |
| B60C 29/06 | (2006.01) |
| B60S 5/04 | (2006.01) |
| B29L 30/00 | (2006.01) |
| F04B 41/02 | (2006.01) |
| F04B 15/00 | (2006.01) |
| F04F 1/18 | (2006.01) |
| F04B 39/12 | (2006.01) |
| F04B 23/02 | (2006.01) |
| F04B 39/00 | (2006.01) |

(52) U.S. Cl.
CPC .......... *B29C 73/166* (2013.01); *B60C 29/062* (2013.01); *B60S 5/04* (2013.01); *F04B 15/00* (2013.01); *F04B 23/02* (2013.01); *F04B 39/0016* (2013.01); *F04B 39/121* (2013.01); *F04B 39/123* (2013.01); *F04B 41/02* (2013.01); *F04F 1/18* (2013.01); *B29L 2030/00* (2013.01)

(58) Field of Classification Search
CPC ....... B29C 73/166; B60C 29/062; B60S 5/04; F04B 15/00; F04B 23/02; F04B 39/0016; F04B 39/123; F04F 1/18; B29L 2030/00
USPC .......................................................... 141/38
See application file for complete search history.

(56) References Cited

U.S. PATENT DOCUMENTS

| 2,263,478 | A | * | 11/1941 | Weeks | F16L 33/224 285/414 |
| 6,382,268 | B1 | * | 5/2002 | Lin | F16K 15/20 137/231 |
| 9,249,914 | B2 | * | 2/2016 | Kuo | F16L 37/32 |
| 2005/0000568 | A1 | * | 1/2005 | Nikolayev | F16L 37/23 137/231 |
| 2008/0257416 | A1 | * | 10/2008 | Hickman | F16L 29/02 137/223 |
| 2012/0231100 | A1 | * | 9/2012 | Chou | B29C 73/166 425/12 |

(Continued)

Primary Examiner — Timothy L Maust
Assistant Examiner — James R Hakomaki
(74) Attorney, Agent, or Firm — Sinorica, LLC

(57) ABSTRACT

A combination structure for a hose connected between a tire and an air compressor is disclosed. The air compressor includes a box in which a compressor unit and a sealant bottle are installed. The sealant bottle has an inlet and an outlet. The inlet of the sealant bottle is connected to one outlet tube of the compressor unit. The hose has a first end and a second end. The first end of the hose is adapted to be connected to the outlet tube of the sealant bottle. The second end of the hose can be connected to the combination structure, which generally includes a cap, a core element, and a plug. With the combination structure, the chemical sealant contained in the sealant bottle can be prevented from flowing out to contaminate objects due to incorrect operation or negligence.

1 Claim, 12 Drawing Sheets

(56) References Cited

U.S. PATENT DOCUMENTS

| | | | |
|---|---|---|---|
| 2013/0105055 A1* | 5/2013 | Chou | B29C 73/166 152/416 |
| 2013/0284312 A1* | 10/2013 | Chou | B29C 73/166 141/38 |
| 2014/0326345 A1* | 11/2014 | Kuo | F16L 37/28 137/798 |
| 2016/0288434 A1* | 10/2016 | Eckhardt | B60C 29/064 |
| 2016/0311411 A1* | 10/2016 | Chou | F04B 35/06 |
| 2018/0029318 A1* | 2/2018 | Franklin | B29C 73/166 |
| 2019/0100062 A1* | 4/2019 | Kuo | F16K 15/207 |

* cited by examiner

COMBINATION STRUCTURE FOR A HOSE CONNECTED BETWEEN AN AIR COMPRESSOR AND A TIRE

TECHNICAL FIELD OF THE INVENTION

The present invention relates to a combination structure for a hose connected between an air compressor and a tire, wherein the compressor includes a box in which a compressor unit and a sealant bottle having an inlet and an outlet is installed; the inlet of the sealant bottle is connected to one outlet tube of the compressor unit; the hose has a first end adapted to be connected to the outlet of the sealant bottle, and a second end connected with the combination structure which is in turn connected to an air valve of the tire; whereby the chemical sealant contained in the sealant bottle can be prevented from flowing out to contaminate the user or other objects due to incorrect operation or negligence.

DESCRIPTION OF THE PRIOR ART

The inventor of the present application has dedicated a long time to development of air compressors for repairing and inflating punctured tires. For a conventional air compressor installed with a sealant bottle for repairing a tire, if a hose is not properly connected between the air compressor and the tire, when the switch of the air compressor is turned on, the chemical sealant contained in the sealant bottle may be ejected out to contaminate the user or other objects. In view of the disadvantage of conventional air compressors, the inventor of the present invention has developed an invention that can prevent the chemical sealant from flowing out due to incorrect operation or negligence. For a better performance in repairing tires, the inventor further improves the invention.

SUMMARY OF THE INVENTION

One object of the present invention is to provide a combination structure for a hose connected between a tire and an air compressor including a box in which a compressor unit and a sealant bottle are installed. The sealant bottle has an inlet and an outlet. The inlet of the sealant bottle is connected to one outlet tube of the compressor unit. The hose has a first end and a second end. The first end of the hose is adapted to be connected to the outlet of the sealant bottle. The second end of the hose can be connected to the combination structure, which generally includes a cap, a core element, and a plug. With the combination structure, the chemical sealant contained in the sealant bottle can be prevented from flowing out to contaminate objects due to incorrect operation or negligence.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
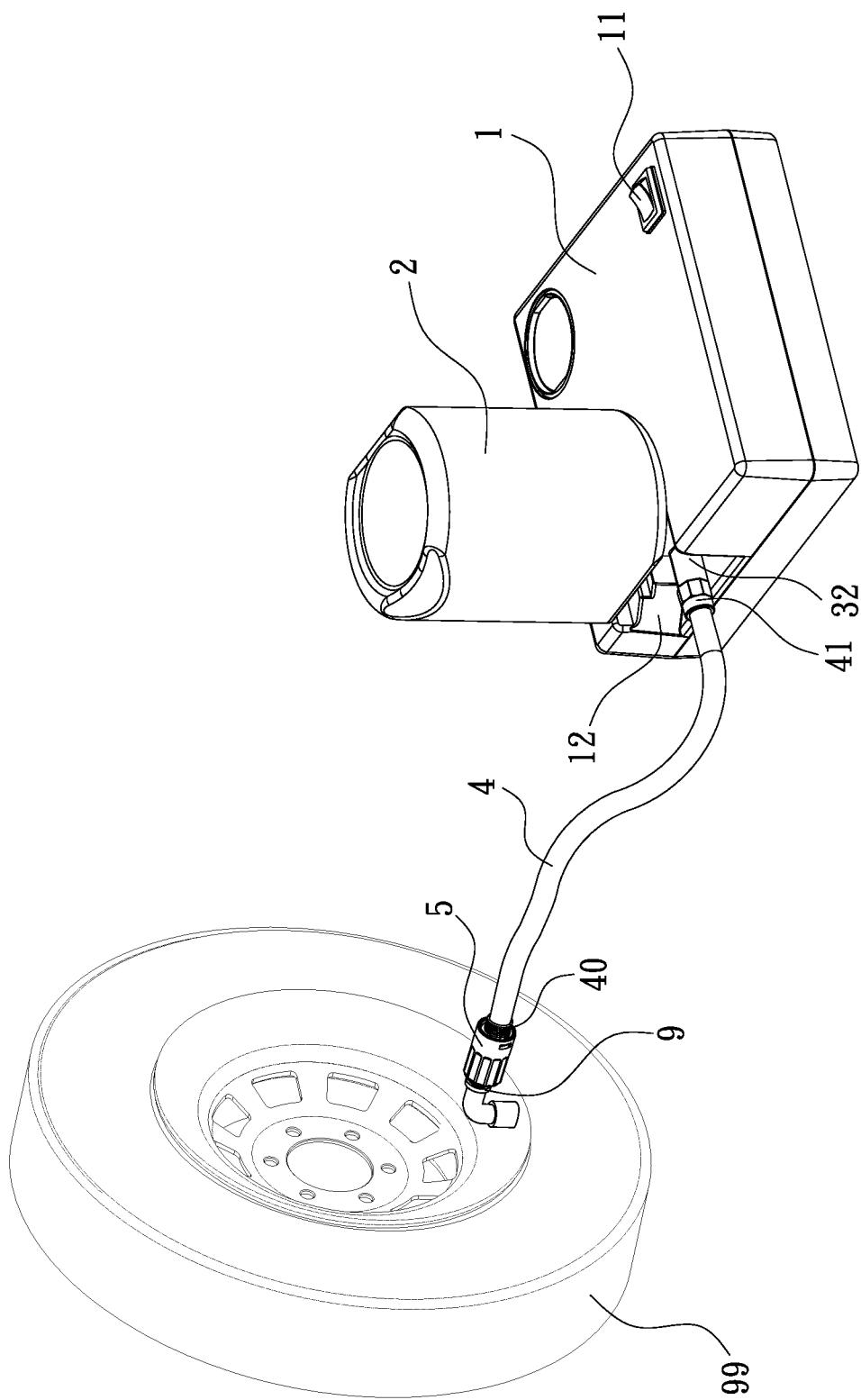
FIG. 1 shows a schematic view, wherein a box installed with a compressor unit and a sealant bottle is used to repair a tire.
Figure 2:
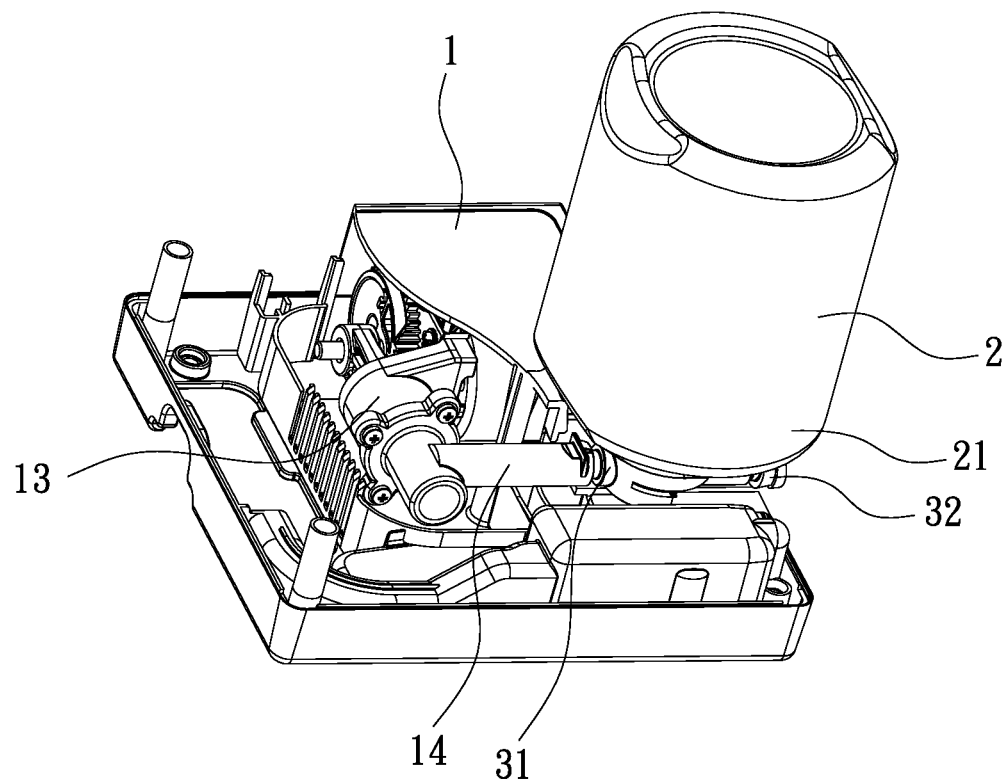
FIG. 2 shows a perspective sectional view of the box, wherein one outlet tube of the compressor unit is connected with an inlet of the sealant bottle.
Figure 3:
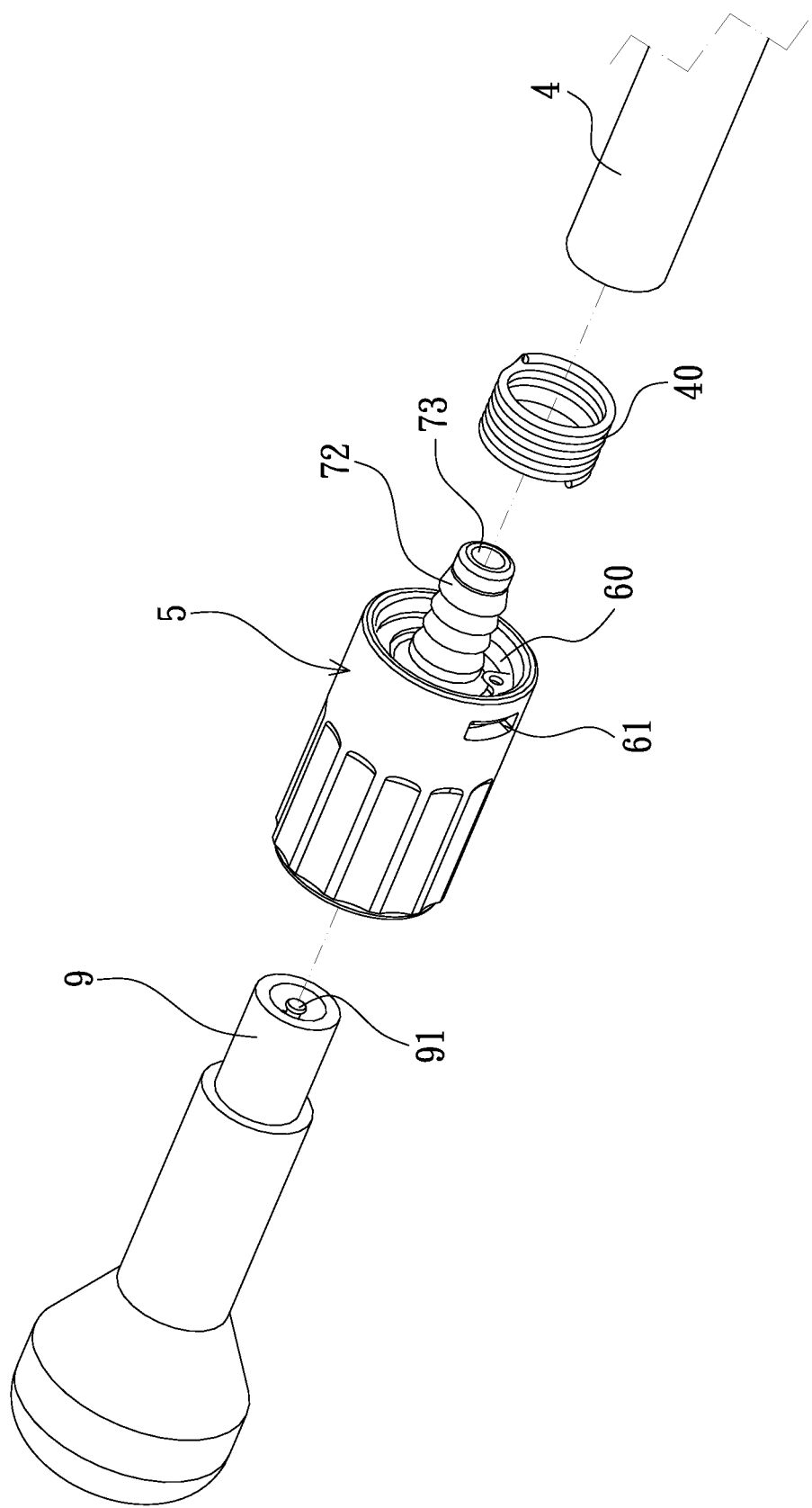
FIG. 3 shows an exploded view, wherein a combination structure according to the present invention is disposed between a hose and an air valve of a tire.
Figure 4:
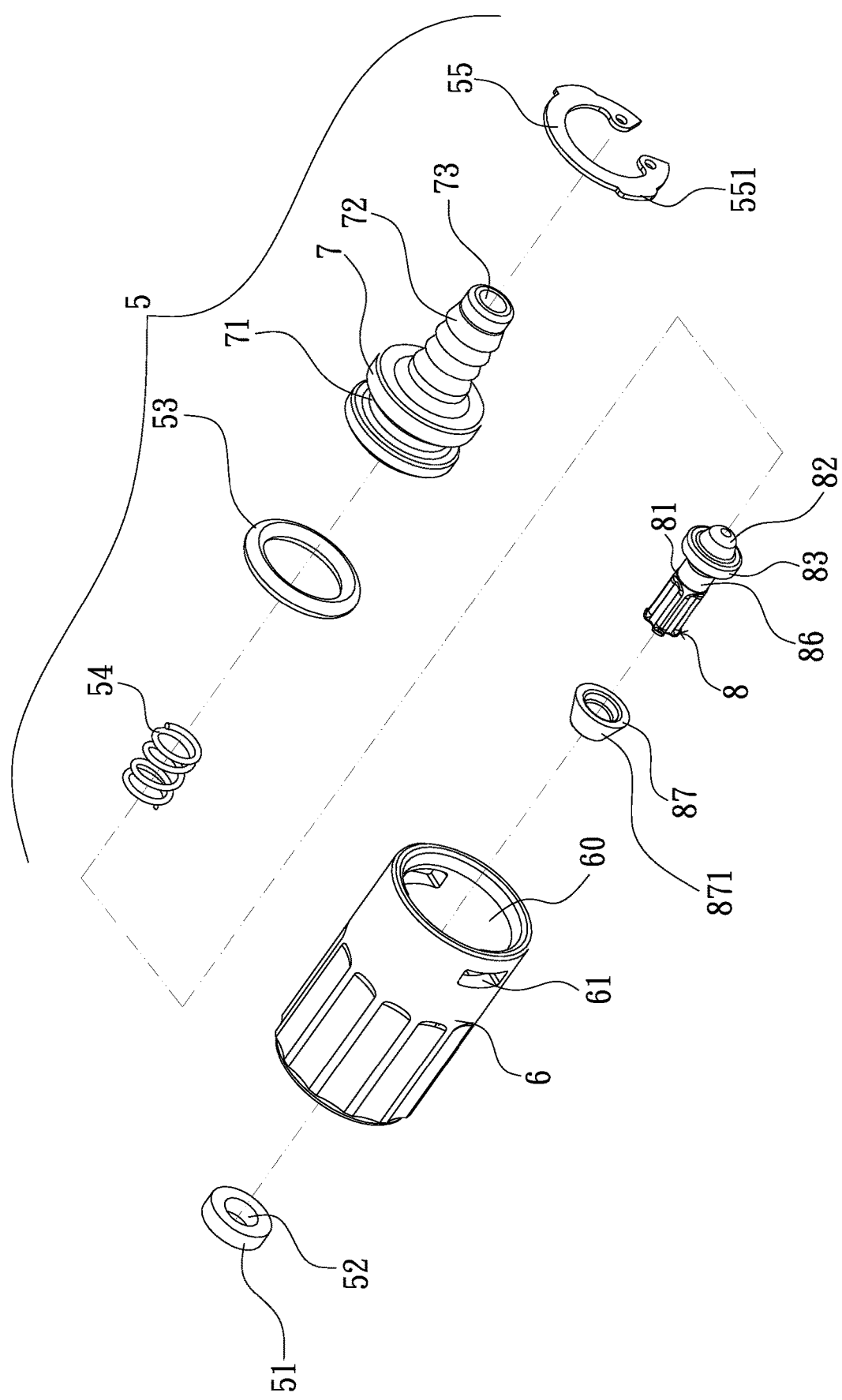
FIG. 4 shows an exploded view of one embodiment of the combination structure.
Figure 5:
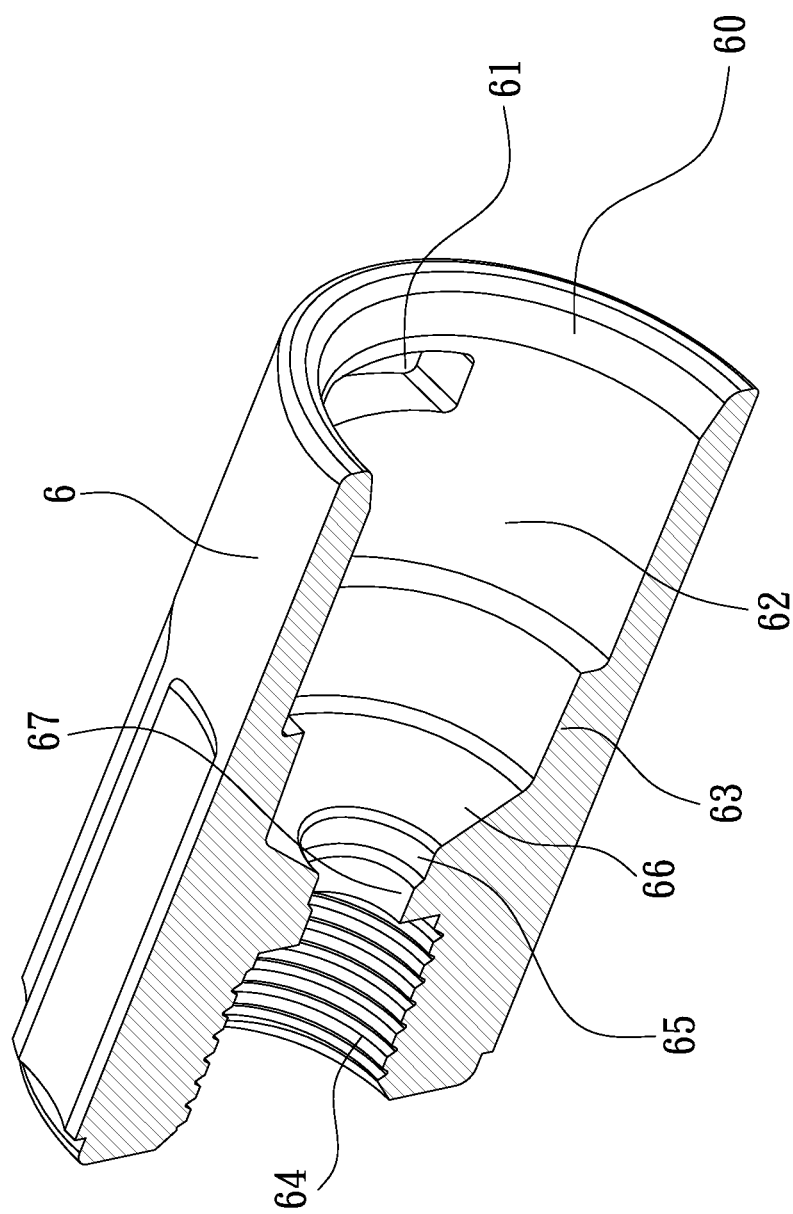
FIG. 5 shows an enlarged sectional view of a cap used in the combination structure of the embodiment.
Figure 6:
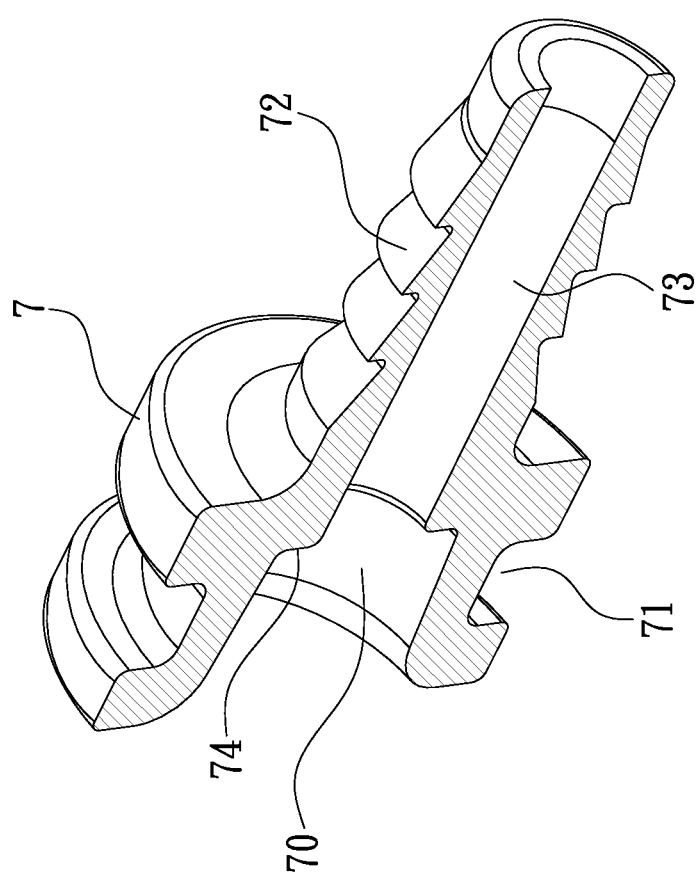
FIG. 6 shows an enlarged sectional view of a core element used in the combination structure of the embodiment.
Figure 7:
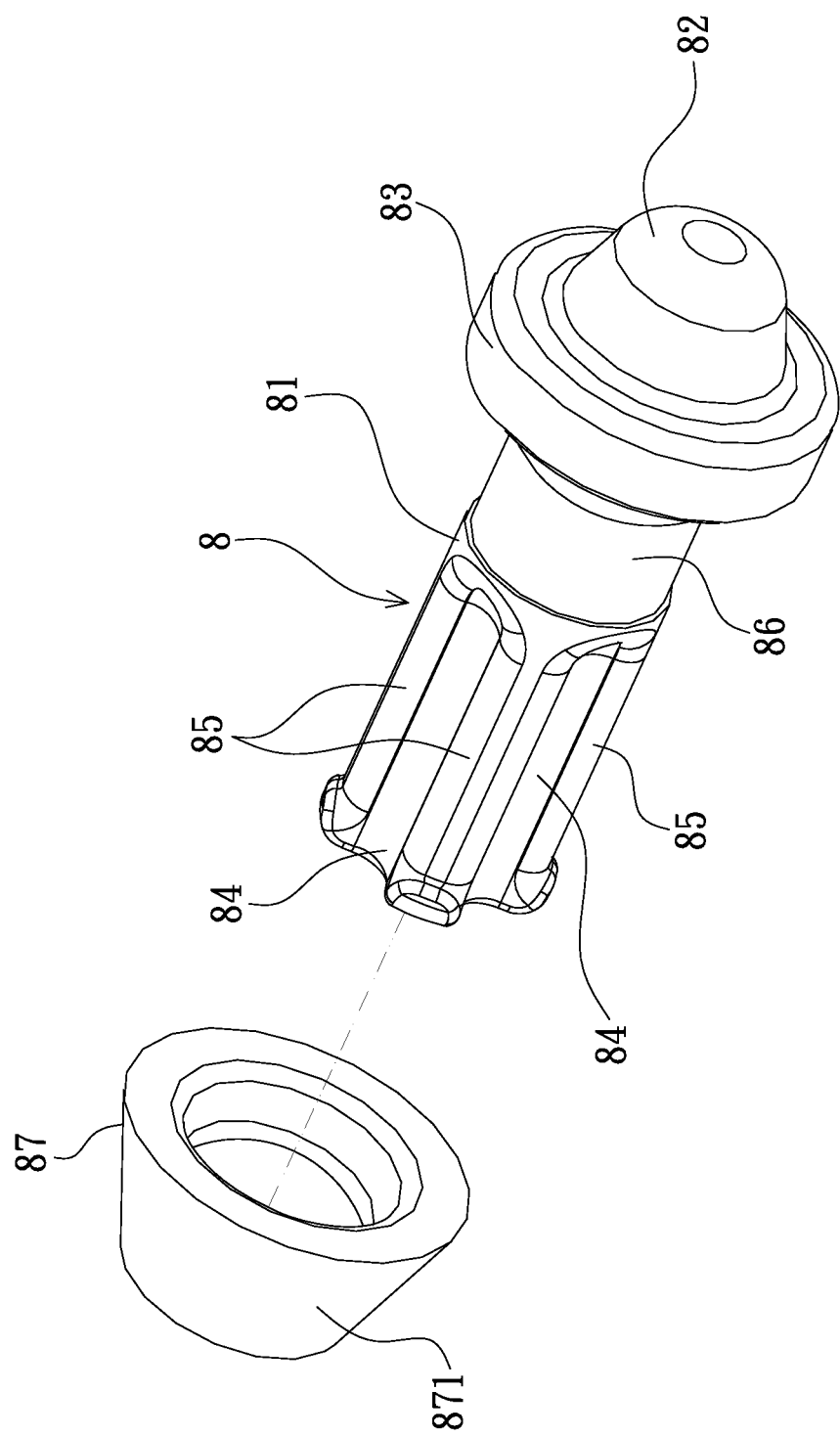
FIG. 7 shows an enlarged sectional view of a plug used in the embodiment of the combination structure.

Referring to FIGS. 1 through 3, an air compressor for vehicles generally includes a box 1, in which a compressor unit 13 and a sealant bottle 2 are installed, wherein the box 1 is provided thereon with a rocker-type switch 11 and a recessed connection socket 12. The compressor unit 13 can be started by turning on the switch 11. An outlet tube 14 of the compressor unit 13 can be exposed to the recessed connection socket 12. The sealant bottle 2 contains therein a chemical sealant and has an inlet 31 and an outlet 32 at its open end 21. The inlet 31 of the sealant bottle 2 can be connected to the outlet tube 14 of the compressor unit 13. The outlet 32 of the sealant bottle 2 allows the chemical sealant to be delivered from the bottle. The sealant bottle 2 is inverted to be installed on the recessed connection socket 12 of the box 1 such that the bottom of the sealant bottle 2 faces up while the open end 21 of the sealant bottle 2 faces down. A hose 4 can be connected between the compressor unit 13 and a tire 99. The hose 4 has a first end 41 adapted to be connected to the outlet 32 of the sealant bottle 2, and a second end connected with a combination structure 5, which is in turn connected with an air valve 9 of the tire. Using electrical power from a vehicle or other DC power supplies, the compressor unit 13 can be started to generate compressed air, which can force the chemical sealant to pass through the hose 4 and the air valve 9 to enter the tire 99 to achieve the purpose of repairing and inflating the tire.

FIGS. 4 through 10 show one embodiment of the combination structure 5 of the present invention, which generally includes a cylindrical cap 6, a core element 7, and a plug 8. The cylindrical cap 6 defines an inner space 62 which opens out at one end to form an opening 60 and defines a threaded hole 64 which communicates with the inner space 62 and opens out at an opposite end (see FIG. 5). Further-more, the cap 6 defines two opposite through holes 61 at a location close to the opening 60. An inwardly extending projection 67 is formed in the cap 6 between the inner space 62 and the threaded hole 64. The inwardly extending projection 67 has an annular peripheral surface 65 defining a central opening which allows the inner space 62 to communicate with the threaded hole 64. A step 63 is formed at a surface of the inner space 62, above the inwardly extending projection 67. The inwardly extending projection 67 has a conical surface 66 at its top, between the step 63 and the annular peripheral surface 65. The core element 7, which are roughly cylindrical in shape (see FIG. 6), has a cylindrical body (not labeled) and a connection stem 72. The cylindrical body of the core element 7 defines an inner space 70 therein and an annular groove 71 at its outer surface. The connection stem 72 extends from the cylindrical body and defines therein a passage 73 communicating with the inner space 70 and is provided with serrated teeth (not labeled) at its outer surface to facilitate connecting with the second end of the hose 4. The inner space 70 has a diameter greater than the passage 73, thus forming a step 74 therebetween. The core element 7 can be fitted into the cap 6 via the opening 60 to be in contact with the step 63. A sealing ring 53 can be fitted into the annular groove 71 of the cylindrical body of the core element 7 to keep airtight. A gasket 51 is fitted in the threaded hole 64 against a bottom of the inwardly extending projection 67 and defines a central opening 52 (see FIGS. 4 and 8). The plug 8 can be fitted in the cap 6 via the opening 60 for normally closing a flow path which is partly formed by the inner space 62 and the threaded hole 64. The plug 8 has a head 82 and a column 81 extending from the head 82 (see FIG. 7). The head 82 is formed with an annular protrusion 83, so that the head 82 has a diameter greater than the column 81. The column 81 is fitted with an sealing envelope 87 and inserted through the central opening 52 of the gasket 51 to enter the threaded hole 64 of the cap 6. More specifically, the column 81 defines a plurality of parallel troughs 84 at its outer surface, along a predetermined length of the column, thus forming a plurality of ribs 85 between the troughs 84. Also, the column 81 has a cylindrical neck portion 86 formed between the head 82 and a location from which the troughs 84 extend. As the column 81 is inserted into the threaded hole 64 of the cap 6, the troughs 84 along with the column 81 extends through the central opening 52 of the gasket 51 located in the threaded hole 64 of the cap 6. The sealing envelope 87 can be fitted around the cylindrical neck portion 86 of the plug 8. The sealing envelope 87 has an outer surface 871 being tapered off in the direction of the column's end to form as a conical surface which can be urged against the intersection of the conical surface 66 of the cap 6 and the annular peripheral surface 65 of the cap 6 (see FIG. 8). A compression spring 54 is located between the head 82 of the plug 8 and the step 74 of the core element 70. More specifically, one end of the spring 54 is urged against the annular protrusion 83 of the head 82, while an opposite end of the spring 54 is urged against the step 74. A C-shaped ring 55 having two opposite tongues 551 is fitted in the cap 6, over the cylindrical body of the core element 7, around the connection stem 72, such that the two opposite tongues 551 are snapped into the two through holes 61 of the cap 6, so that the core element 7 can be firmly fixed to the cap 6. The second end of the hose 4 can be fitted over the connection stem 72 of the core element 7 of the combination structure 5. A fixing coil 40 can be fitted over the second end of the hose 4 to have the hose 4 firmly connected with the connection stem 72 of the combination structure 5.

Figure 8:
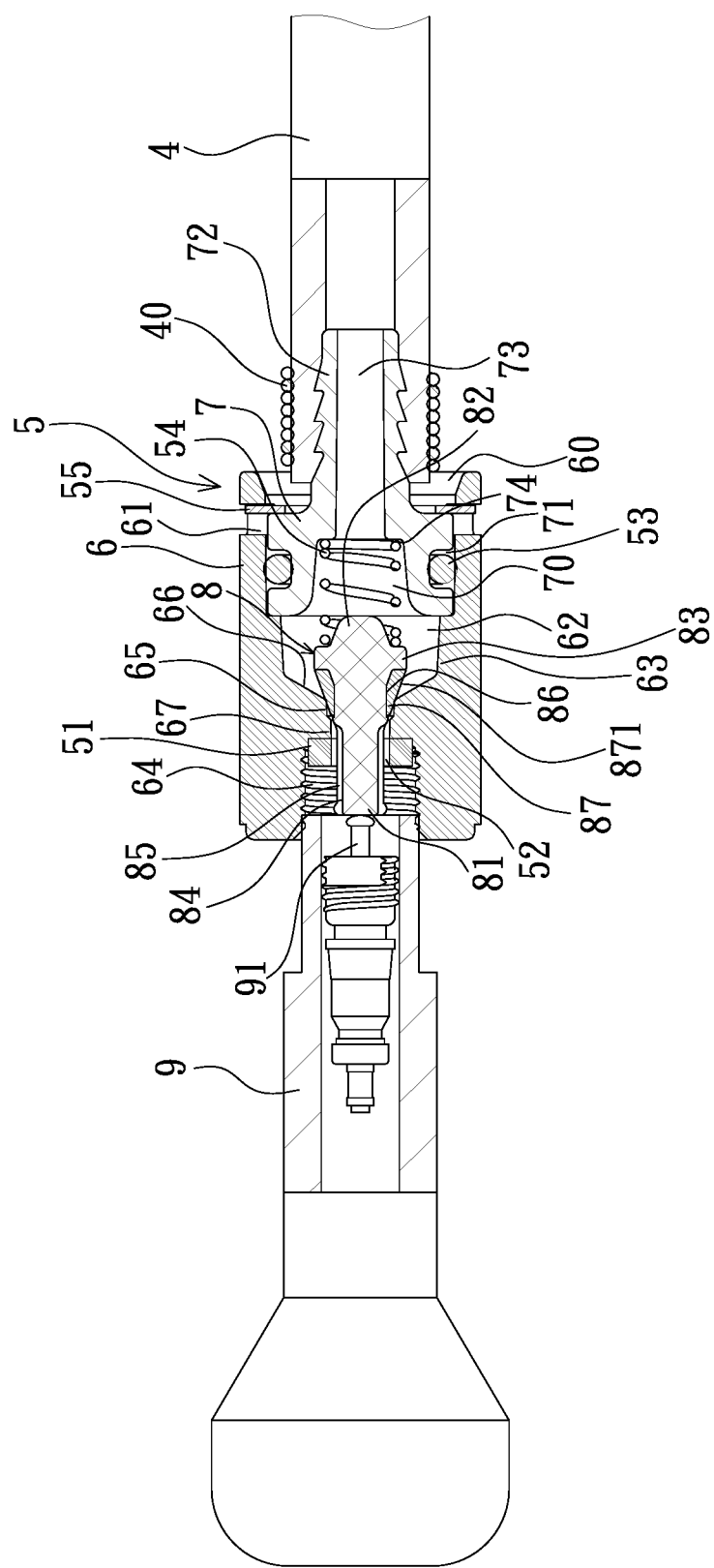
FIG. 8 shows a sectional view of the combination structure connected between a hose and an air valve of a tire, wherein the air valve is in slight threaded engagement with the combination structure.

FIG. 8 shows a state of the combination structure 5, wherein the threaded hole 64 of the combination structure 5 is in slight threaded engagement with the air valve 9 of the tire 99. Under this circumstance, the sealing envelope 87 is urged by the spring 54 to have its conical surface 871 against the intersection of the conical surface 66 and the annular peripheral surface 65, thus sealing the central opening of the inwardly extending projection 67, so that the chemical sealant cannot flow through the central opening 52 of the gasket 51 located in the threaded hole 64 and thus can prevent the chemical sealant from passing through the combination structure 5 even as the switch 11 of the compressor unit 13 is turned on.

Figure 9:
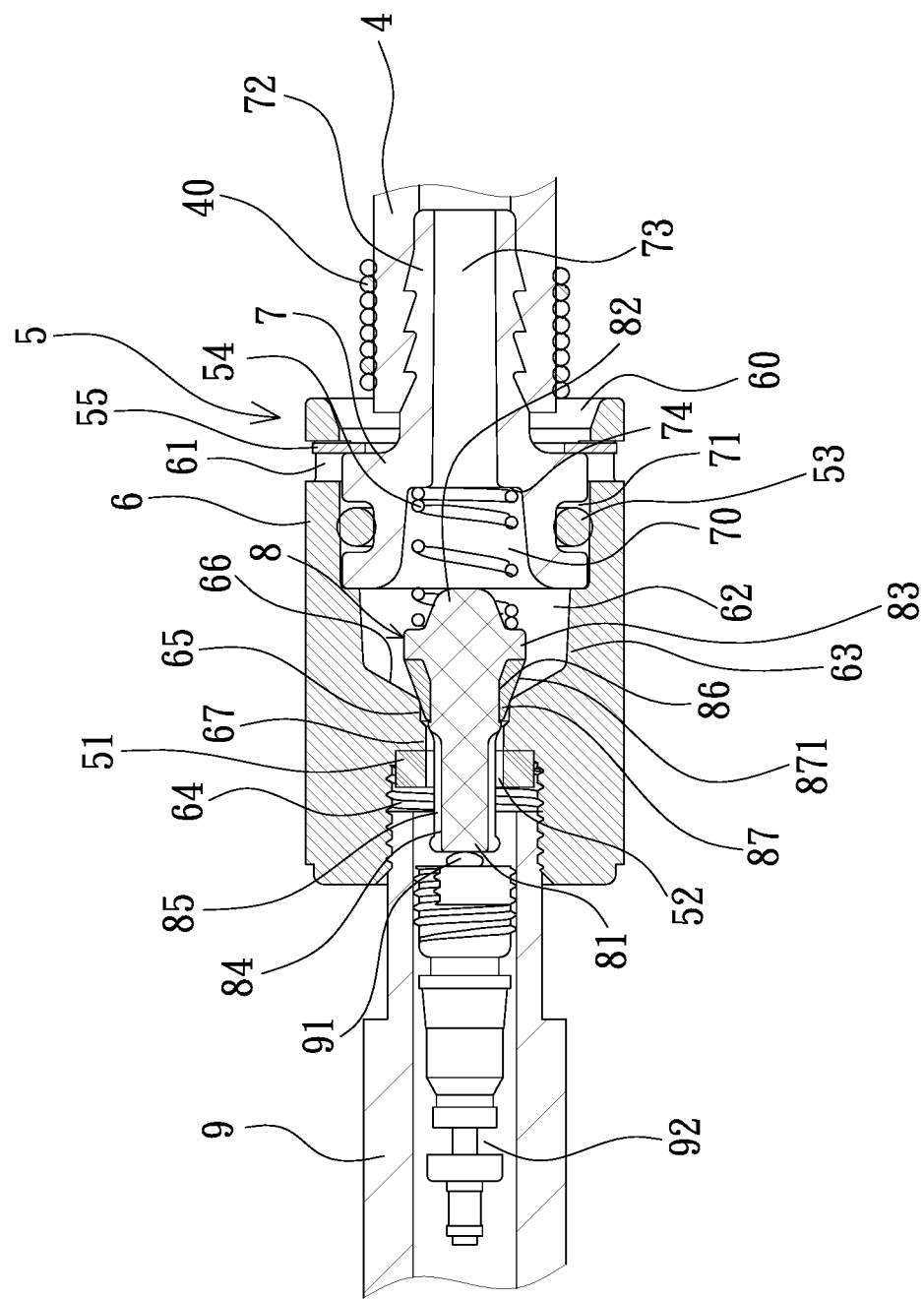
FIG. 9 shows a sectional view of the combination structure connected between a hose and an air valve of a tire, wherein the air valve is in further threaded engagement with the combination structure, so that the air inlet of the air valve can be opened.
Figure 10:
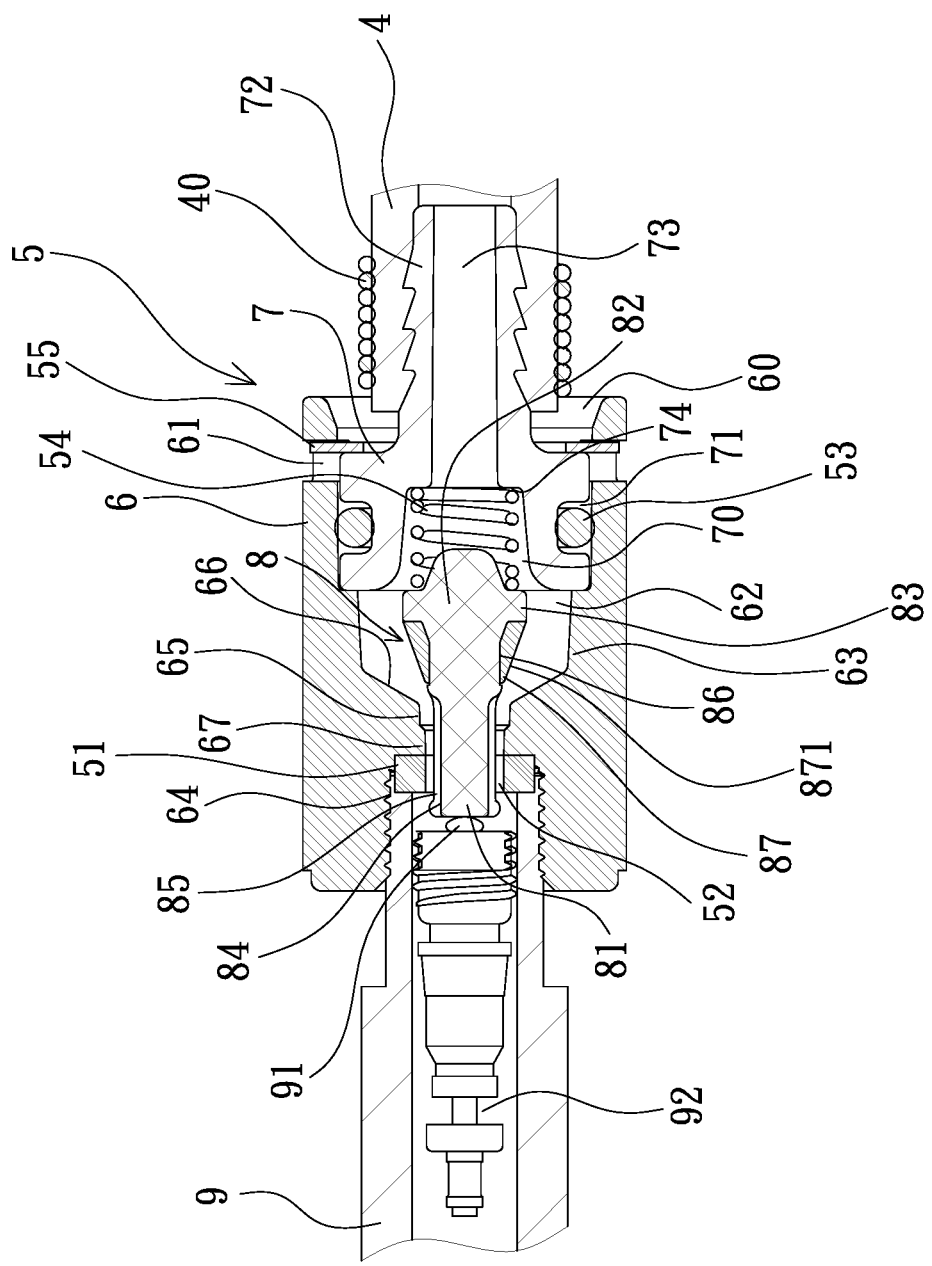
FIG. 10 shows a sectional view of the combination structure connected between a hose and an air valve of a tire, wherein the air valve is in full threaded engagement with the combination structure, so that a plug of the combination structure can be pushed to open the combination structure to allow the chemical sealant to enter the tire.

When the threaded hole 64 of the combination structure 5 is in further threaded engagement with the air valve 9 of the tire 99, the plug 8 can push a central pin 91 of the air valve 9 to open an air inlet 92 of the valve (see FIG. 9). As the threaded hole 64 is in full thread engagement with the air valve 9, as shown in FIG. 10, the plug 8 can be pushed by the central pin 91 of the air valve 9 to move towards the core element 7, so that the conical surface 871 can be clear of the intersection of the conical surface 66 and the annular peripheral surface 65 of the cap 6, and thus a flow path for the chemical sealant can be formed. Specifically, the chemical sealant being forced by the compressed air can pass through the passage 73, the inner space 70, the central opening 52 of the gasket 51 (with the assistance of the troughs 84 of the plug 8), the threaded hole 64, and the air inlet 92 of the valve 9 to enter the tire 99 to repair and inflate the tire until a normal pressure within the tire is reached.

Figure 11:
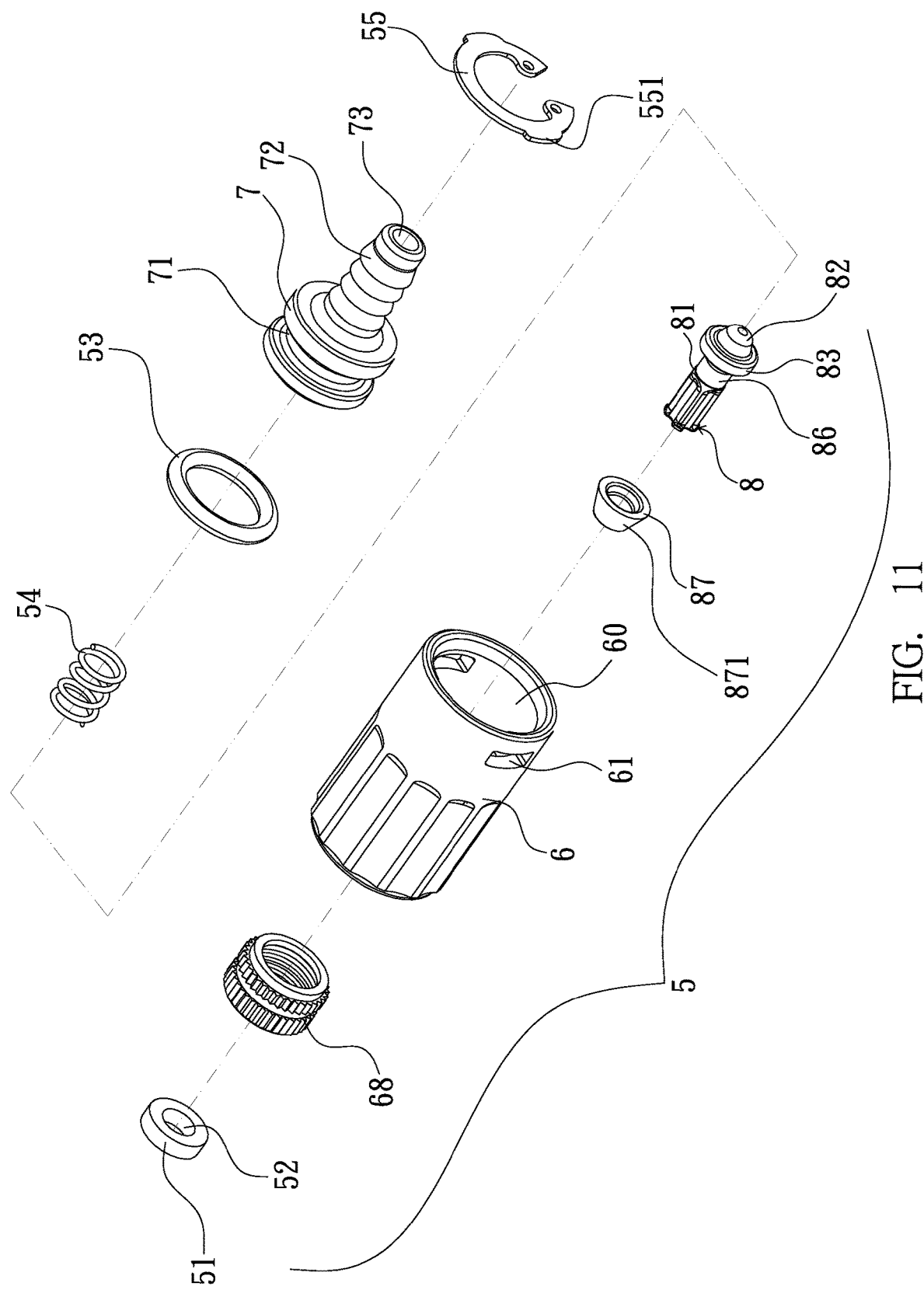
FIG. 11 shows an exploded view of a second embodiment of the combination structure.
Figure 12:
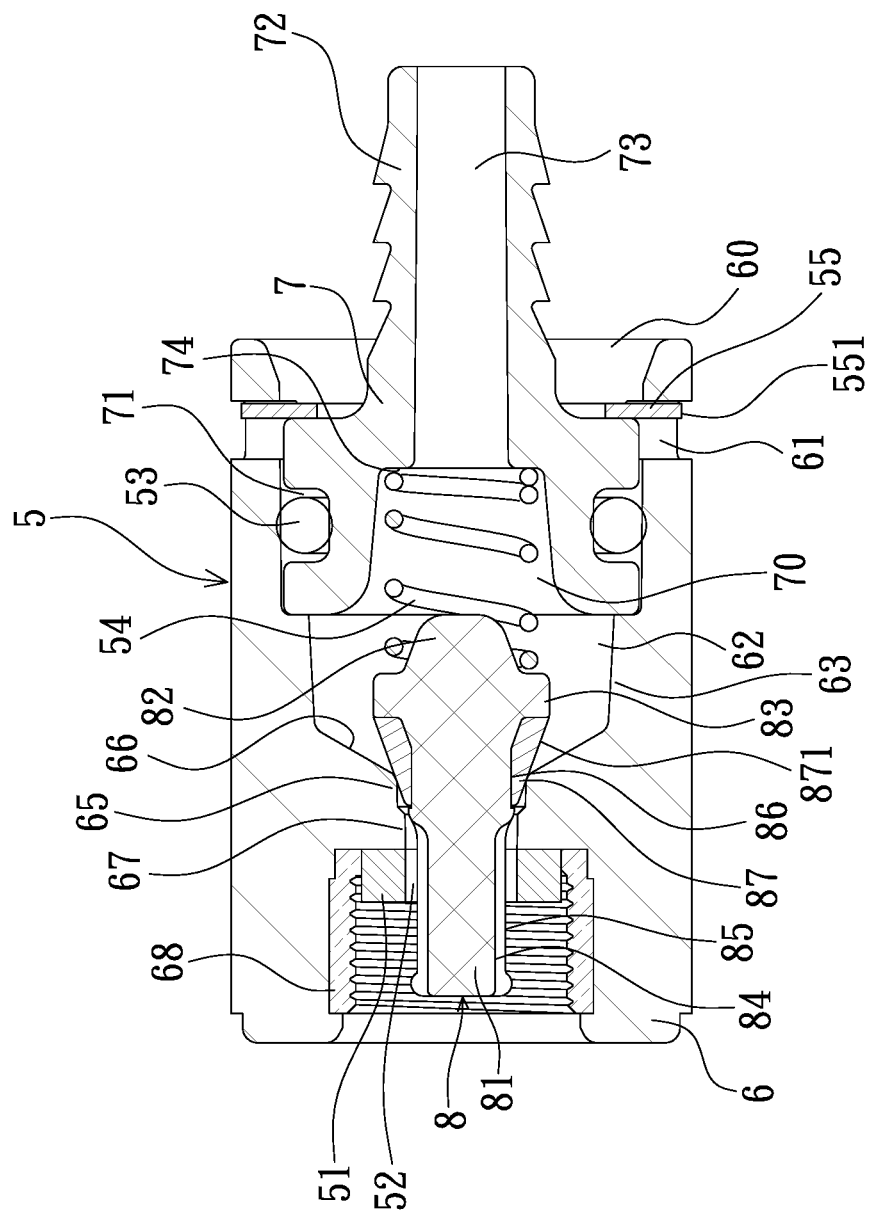
FIG. 12 shows a sectional view of the combination structure of the second embodiment.

FIGS. 11 and 12 show a second embodiment of the combination structure, wherein the cap 6 is provided with a molded-in copper nut 68 at one end opposite to the opening 60. The copper nut 68 defines a threaded hole communicating with the inner space 62 and opening out at the end opposite to the opening 60. The gasket 51, which defines a central opening 52 coaxial with the threaded hole of the copper nut 68, is provided in molded-in copper nut 68, in contact with a bottom of the inwardly extending projection 67.

As a summary, the present invention provides a combination structure for a hose connected between an air compressor and a tire for repairing and inflating the tire. With the combination structure, the problem of chemical sealant flowing out due to incorrect operation of an air compressor or negligence can be prevented.

I claim:

1. A combination structure for a hose connected between an air compressor and a tire, the air compressor including a box, a compressor unit being installed in the box, a sealant bottle being installed on the box, the compressor unit being configured to be electrically started to generate compressed air, the sealant bottle containing therein a chemical sealant and having an inlet connected to an outlet tube of the compressor unit and having an outlet through which the chemical sealant is delivered, the hose having a first end adapted to be connected to the outlet of the sealant bottle, and a second end being configured to be connected with the combination structure, the combination structure comprising:

a cap, the cap defining an inner space and a threaded hole, the inner space opening out at one end and at an opposite end, the threaded hole communicating with the inner space and being formed at the opposite end for threaded engagement with an air valve of the tire, an inwardly extending projection being formed in the cap, between the inner space and the threaded hole, the inwardly extending projection having an annular peripheral surface defining a central opening which allows the inner space to communicate with the threaded hole;

a core element, the core element being fitted into the cap via an opening of the cap where the inner space opens out, the core element having a cylindrical body and a connection stem defining therein a passage and extending from the cylindrical body, beyond the opening of the cap for connection with the second end of the hose, the cylindrical body defining an inner space therein and an annular groove at its outer surface, the inner space of the cylindrical body communicating with the passage of the connection stem and having a diameter greater than the passage of the connection stem, thus forming a step therebetween;

a sealing ring, the sealing ring being fitted into the annular groove of the cylindrical body of the core element;

a gasket, the gasket being fitted in the threaded hole against a bottom of the inwardly extending projection and defining a central opening; and a plug, the plug being fitted in the cap and having a head and a column which has a diameter less than the head and extends from the head and is fitted with a sealing envelope and is inserted through the central opening of the gasket to enter the threaded hole of the cap;

a spring, the spring being located between the head of the plug and the step of the core element;

the spring normally forcing the sealing envelope to seal the central opening of the inwardly extending projection of the cap, thus preventing the chemical sealant from flowing out due to incorrect operation even as the compressor unit is running;

the box being provided thereon with a rocker-type switch and a recessed connection socket, the outlet tube of the compressor unit being exposed to the recessed connection socket, and the sealant bottle being inverted to be installed on the recessed connection socket of the box such that a bottom of the sealant bottle faces up while an open end of the sealant bottle faces down;

the cap being further provided with a step above the inwardly extending projection to be in contact with a bottom of the core element where the inner space opens out;

the inwardly extending projection having a conical surface at its top, the conical surface being connected in between the step and the annular peripheral surface;

the connection stem of the core element being provided at its outer surface with serrated teeth to facilitate connecting with the second end of the hose;

a fixing coil, the fixing coil being configured to be fit over the second end of the hose, so that the hose can be firmly connected with the connection stem of the core element;

the head of the plug being formed with an annular protrusion, which is urged against by one end of the spring;

the column defining at its outer surface a plurality of parallel troughs extending along a predetermined length, thus forming a plurality of ribs between the troughs, and having a cylindrical neck portion formed between the head and a location from which the troughs extend;

the sealing envelope being fitted around the cylindrical neck portion of the plug and having an outer surface being tapered off to form as a conical surface being configured to be urged against an intersection of the conical surface of the cap and the annular peripheral surface of the cap; and a C-shaped ring, the C-shaped ring having two opposite tongues fitted in the cap, over the cylindrical body of the core element, around the connection stem, such that the two opposite tongues are snapped into the two through holes of the cap, so that the core element is firmly fixed to the cap.

\* \* \* \* \*